United States Patent [19]

Priest

[11] Patent Number: 4,771,987
[45] Date of Patent: Sep. 20, 1988

[54] WINCH FOR LOADING AND UNLOADING SMALL CRAFT ON TRAILERS

[76] Inventor: Richard K. Priest, 201 Newman Dr., Lyman, S.C. 29365

[21] Appl. No.: 199

[22] Filed: Jan. 2, 1987

[51] Int. Cl.$^4$ .............................................. B66D 1/26
[52] U.S. Cl. ................................... 254/280; 254/295; 254/376; 280/414.1
[58] Field of Search ............... 254/279, 310, 280, 278, 254/294, 295, 323, 376; 280/414.1, 414.2, 414.3

[56] References Cited

U.S. PATENT DOCUMENTS

| | | |
|---|---|---|
| 372,839 | 11/1887 | Clemons . |
| 594,619 | 11/1897 | Haddow . |
| 1,014,860 | 1/1912 | Wilds . |
| 1,436,375 | 11/1922 | Barney . |
| 1,473,248 | 11/1923 | Norris . |
| 1,626,114 | 4/1927 | Chamberlain ..................... 254/280 |
| 2,047,494 | 7/1936 | Schat ................................. 254/298 |
| 2,157,153 | 5/1939 | Troche . |
| 2,435,580 | 2/1948 | Glennon . |
| 2,888,152 | 5/1959 | Sugg ................................. 254/278 X |
| 4,232,990 | 11/1980 | Pierce ......................... 280/414.1 X |
| 4,319,862 | 3/1982 | Cook ........................... 280/414.1 X |
| 4,365,923 | 12/1982 | Lubbers ..................... 280/414.1 X |
| 4,369,952 | 1/1983 | Kurling . |
| 4,429,893 | 2/1984 | Palamara ......................... 280/414.1 |
| 4,566,674 | 1/1986 | Ebey et al. ..................... 254/376 X |

Primary Examiner—Stuart S. Levy
Assistant Examiner—Katherine Matecki
Attorney, Agent, or Firm—Dority & Manning

[57] ABSTRACT

The present invention relates to a winch and a boat trailer equipped therewith. The winch has a retaining line reel for retaining a boat loaded onto the trailer in a secure position thereon. The winch also has a drum or capstan on the same axle with the retaining reel for advancing the bow line or rope for loading and unloading the boat onto and off said trailer. The winch may be manually driven or it may be power driven.

18 Claims, 2 Drawing Sheets

WINCH FOR LOADING AND UNLOADING SMALL CRAFT ON TRAILERS

The present invention relates to an improved winch to be mounted on a trailer for loading and unloading small water craft, such as boats.

In recent years, winches for loading and unloading small water craft onto trailers have comprised two basic types. One type has used a standard reel to which a rope is affixed. With this type of winch, in order to load or unload a boat or other small water craft, it is necessary for the operator to wade into the water to connect the rope which is fastened to the standard type reel. This can be rather disagreeable where the weather is cold or where the lake bottom is mucky or rocky.

A second type of winch has used a capstan or drum around which the bow rope from the boat is wrapped two or three turns and the water craft or boat is then winched onto the trailer by the drum. The advantage of this type of winch is that the rope carried by the boat for towing or for tying up at the wharf can be used by the winch to winch the boat onto the trailer. The disadvantage is that the wrapping of the bow rope about the capstan is insufficient to hold the boat in place on the trailer since the capstan exerts a winching action on the rope only as long as the free end of the rope is held by the operator.

SUMMARY OF THE INVENTION

It is an object of the present invention is to provide a winch which has all of the advantages of the two types of winches noted above without having the disadvantages mentioned.

It is an object of the present invention to provide a winch which will utilize the bow rope to pull the boat onto the trailer but which also has a retaining rope and reel for retaining the boat on the trailer once it is loaded thereon.

It is another object of the invention to provide a winch which can haul a boat onto a boat trailer and secure it thereon without necessitating the operator to wade into the water to make connection with the boat.

These objects and others which will become obvious are accomplished by the winch of the invention which comprises a retaining rope and reel and a capstan, each affixed to the same axle. The winch of the invention can be manually driven or it can be power driven as desired.

BRIEF DESCRIPTION OF THE DRAWINGS

Further advantages will be evident from the following description of the invention, which refers to the accompanying drawings, of which.

DETAILED DESCRIPTION OF THE INVENTION

Figure 1:
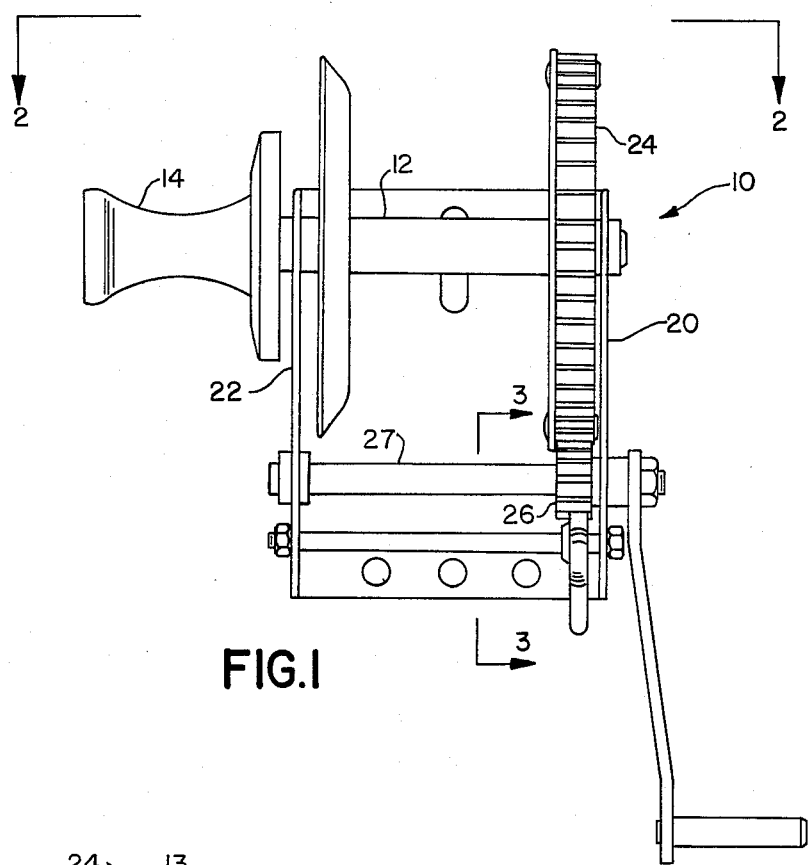
FIG. 1 is a diagrammatic top plan view of the winch of the invention.
Figure 2:
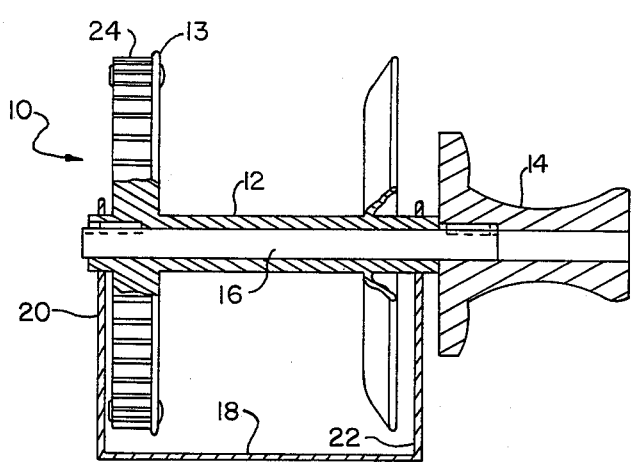
FIG. 2 is a rear elevation of the winch of the invention taken along lines 2—2 of FIG. 1.
Figure 3:
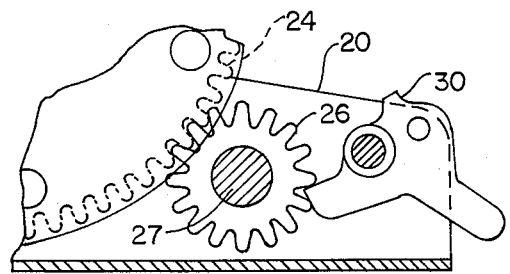
FIG. 3 is a detailed view of the pawl locking device taken along lines 3—3 of FIG. 1.

Referring now to FIGS. 1, 2 and 3 of the drawings, wherein is illustrated the winch of the invention. Winch 10 includes a retainer rope reel 12 and a capstan 14 fixed to an axle 16 for rotation therewith. Axle 16 is supported for rotation by first axle support 20 and second axle support 22 extending at right angles from base 18. Second axle support 22 supports the axle between reel 12 and capstan 14. Fixed to flange 13 of reel 12 is a ring gear 24. Ring gear 24 is secured to flange 13 by means of mechanical fasteners 25 such bolts or rivets.

Ring gear 24 meshes with, and is driven by, a drive gear 26 which is fixed to a drive shaft 27. Drive shaft 27 is supported by supports 20 and 22 for rotation in relation thereto. One end of drive shaft 27 extends through support 20 and has affixed thereto a crank arm 28. Crank arm 28 terminates in a crank handle 29. Also supported by supports 20 and 22 is a locking pawl shaft 31 which supports a locking pawl 30, which permits drive gear 26 to rotate in a counterclockwise direciton to drive ring gear 24 and thereby reel 12 and capstan 14.

Figure 4:
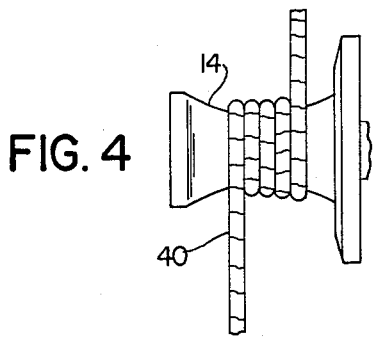
FIG. 4 is a partial view fo the capstan, showing the bow rope wrapped about it during the loading or unloading operation.
Figure 5:
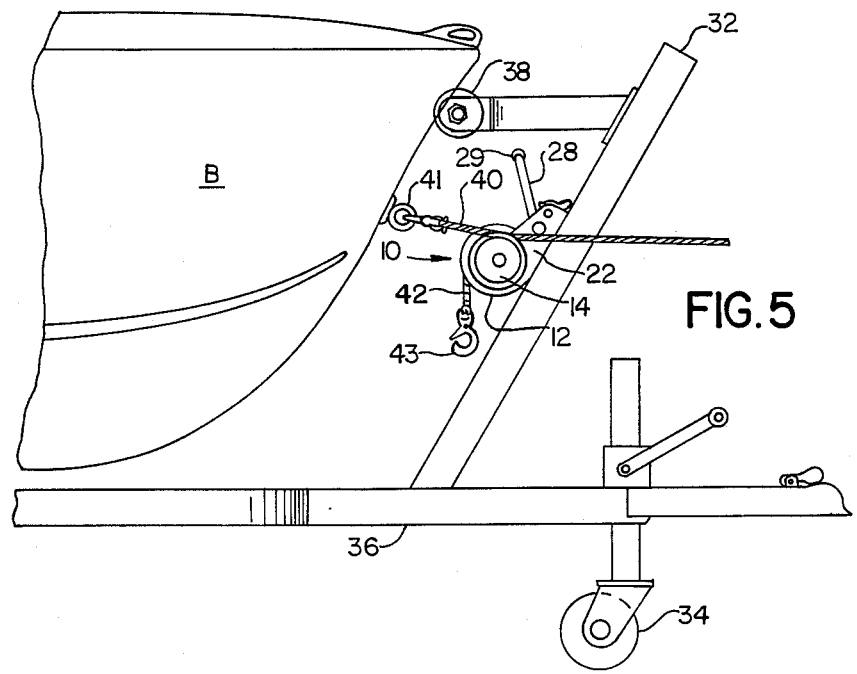
FIG. 5 is a perspective view of the boat, trailer and winch of the invention.

Referring now to FIG. 5 wherein winch 10 is shown mounted on frame member 32 of a boat trailer which is supported by trailer 34. The boat B is winched onto the trailer against bumper 36 and support roller 38 by means of a bow rope 40 wrapped several turns about capstan 14, as seen in FIG. 4. The loose end of bow rope 40 is held by the operator who turns crank 28 to drive capstan 14 in a clockwise direction, as seen in FIG. 5. Whenever the boat is drawn into place against bumper 36 and support roller 38, retainer rope 42 is connected to the boat bracket 41 by hook 43 and pawl 30 locks the drive gear 26 in place when boat B is held snugly against bumper 36 and support roller 38. Retainer rope 42 is fixed to reel 12 and thereby retains the boat in a secured position, whereupon bow rope 40 may then be stowed in the boat until the time comes for unloading the boat from the trailer. Whenever it is necessary to unload the boat from the trailer, the operation of loading the boat is reversed. Bow rope 40 is wrapped about capstan 14 and crank 28 is operated to release the pressure on the pawl 30. Retainer rope 42 is unhooked from the bracket 41 and pawl 30 is released to slowly let the boat off the trailer runways into the water for launching purposes.

With the invention, one man can load the boat by himself by taking hold of the bow rope and letting the boat drift to the end of the trailer and position it with the bow rope. The bow rope is used to pull the bow of the boat onto the trailer against the end roller. Several turns of the bow rope are taken about capstan and the loose end of the rope is held by the operator in his left hand. This rope is continued to be held and to be fed as the operator cranks the winch to wind the rope about capstan as seen in FIG. 4. This procedure continues until the bow rope has drawn the boat onto the trailer in the position shown in FIG. 5. At this point, retaining rope 42 is snapped into the tow rope bracket 41 and crank 28 is operated until the winch is locked in place by pawl 30 to retain the boat in its position on the trailer.

While the winch, as illustrated herein, has been manually operated, it is to be understood that the winch could be power operated just as well.

It will be understood, of course, that while the form of the invention herein shown and described constitutes the preferred embodiment of the invention, it is not intended to illustrate all possible forms of the invention. It will also be understood that the words used herein are words of description rather than of limitation and that various changes may be made without departing from the spirit and the scope of the invention herein disclosed and claimed.

What is claimed is:

1. A winch for loading and unloading boats which have bow ropes and for retaining said boats, onto trailers, comprising:
   (a) an elongated axle;
   (b) a retaining strand reel carrying a retaining rope, said rope being affixed to said reel and said reel being affixed to an intermediate portion of said axle;
   (c) a capstan affixed to one end of said axle and axially spaced from said retaining strand reel;
   (d) base means for supporting said axle for rotation, including support means on one side of said retaining reel and between said capstan and the other side of said retaining reel; and
   (e) means for rotating said elongated axle, said retaining reel, and said capstan in the same direction to advance both said bow rope and said retaining rope in the same direction to load said boat onto said trailer or both in the opposite direction to unload said boat therefrom, saaid retaining rope having one end affixed to said retaining reel and its other end adapted to be affixed to said boat and said bow rope having one end affixed to the bow of said boat and the other end being wrapped one or more turns about said capstan but not affixed thereto.

2. A winch as set forth in claim 1, wherein the means for rotating said retaining reel and said capstan comprises a drive gear mounted on a drive shaft.

3. A winch as set forth in claim 2, wherein said means for rotating said retaining reel and capstan comprises a pawl for locking said drive gear against rotation in one direction while permitting said drive gear to freely rotate in the opposite direction.

4. A winch as set forth in claim 3, wherein said pawl has means for locking said drive gear and said winch against rotation.

5. A winch as set forth in claim 1, wherein the means for rotating and retaining reel and said capstan comprises a drive gear rotated manually by a crank.

6. A winch as set foth in claim 1, wherein the means for rotating said retaining reel and said capstan comprises a power driven drive gear.

7. A winch as set forth in claim 1, wherein the means for rotating said retaining reel and said capstan comprises a ring gear affixed to said retaining reel and a drive gear in mesh therewith.

8. A winch as set forth in claim 7, wherein said dirive gear is connected to a crank.

9. A winch as set forth in claim 7, wherein said drive gear is connected to power means.

10. A boat trailer for hauling boats, said boats having bow ropes, comprising:
   (a) a frame for supporting a boat; and
   (b) a winch for loading boats onto and for unloading boats from said trailer and for retaining said boats disposed on the frame of said trainer in a position for pulling such boats onto the suport frame of said trailer and for retaining said boat thereon, comprising:
   i. a base affixed to said trailer;
   ii. an elongated axle supported on said base for rotation relative thereto;
   iii. a retaining reel affixed to an intermediate portion of said axle and having attached thereto a retaining rope, one end of which is adapted to be connected to said boat;
   iv. a capstan affixed to one end of said axle and axially spaced from said retaining reel; and
   v. means for rotating said elongated axle, said retaining reel, and said capstan, in the same direction to advance both said bow rope and said retaining rope in the same direction to load onto said trailer or both in the opposite direction to unload said boat therefrom, said retaining rope having one end affixed to said retaining reel and its other end adapted to be affixed to said boat and said bow rope having one end affixed to said boat and the other end being wrapped one or more turns about said capstan but not affixed thereto.

11. A winch as set forth in claim 10, wherein the means for rotating said retaining reel and said capstan comprises a drive gear mounted on a drive shaft.

12. A winch as set forth in claim 11, wherein said means for rotating said retaining reel and capstan comprises a pawl for locking said drive gear against rotation in one direction while permitting said drive gear to freely rotate in the opposite direction.

13. A winch as set forth in claim 12, wherein said pawl has means for locking said drive gear and said winch against rotation.

14. A winch as set forth in claim 10, wherein the means for rotating said retaining reel and said capstan comprises a drive gear rotated manually by a crank.

15. A winch as set forth in claim 10, wherein the means for rotating said retaining reel and said capstan comprises a power driven drive gear.

16. A winch as set forth in claim 10, wherein the means for rotating said retaining reel and said capstan comprises a ring gear affixed to said retaining reel and a drive gear in mesh therewith.

17. A winch as set forth in claim 16, wherein said drive gear is driven manually.

18. A winch as set forth in claim 16, wherein said drive gear is driven by power means.

* * * * *